(12) United States Patent
Bairi

(10) Patent No.: US 10,812,103 B1
(45) Date of Patent: Oct. 20, 2020

(54) CYCLIC REDUNDANCY CHECK ENGINE AND METHOD THEREFOR

(71) Applicant: Xilinx, Inc., San Jose, CA (US)

(72) Inventor: Ravichander Bairi, Hyderabad (IN)

(73) Assignee: XILINX, INC., San Jose, CA (US)

( * ) Notice: Subject to any disclaimer, the term of this patent is extended or adjusted under 35 U.S.C. 154(b) by 275 days.

(21) Appl. No.: 15/903,931

(22) Filed: Feb. 23, 2018

(51) Int. Cl.
| H03M 13/00 | (2006.01) |
|---|---|
| H03M 13/09 | (2006.01) |
| G06F 21/76 | (2013.01) |
| G06F 11/10 | (2006.01) |

(52) U.S. Cl.
CPC ....... H03M 13/091 (2013.01); G06F 11/1004 (2013.01); G06F 21/76 (2013.01); H03M 13/6575 (2013.01)

(58) Field of Classification Search
CPC ...... G06F 11/10; G06F 11/1004; G06F 21/76; H03K 19/177; H03M 13/00; H03M 13/09; H03M 13/091; H03M 13/6575; H04L 12/56; H04L 27/28

See application file for complete search history.

(56) References Cited

U.S. PATENT DOCUMENTS

| | | | |
|---|---|---|---|
| 6,191,614 B1 | 2/2001 | Schultz et al. | |
| 6,791,995 B1 * | 9/2004 | Azenkot | H04B 1/707 348/E5.008 |
| 6,874,107 B2 | 3/2005 | Lesea | |
| 7,320,101 B1 * | 1/2008 | Bain | H03M 13/091 714/781 |
| 7,363,573 B1 | 4/2008 | Bataineh | |
| 7,607,025 B1 | 10/2009 | Trimberger | |
| 7,613,991 B1 * | 11/2009 | Bain | H03M 13/091 714/807 |
| 7,761,776 B1 | 7/2010 | Bataineh | |
| 8,001,446 B2 * | 8/2011 | Walma | H03M 13/09 714/758 |
| 8,161,365 B1 | 4/2012 | Awalt | |
| 8,225,187 B1 | 7/2012 | Schultz et al. | |
| 8,312,362 B1 * | 11/2012 | Barash | H03M 13/091 714/807 |
| 8,443,256 B2 | 5/2013 | Shafai et al. | |
| 9,350,385 B2 | 5/2016 | Jiang et al. | |
| 9,639,416 B1 * | 5/2017 | Parlour | G06F 11/1004 |
| 2004/0267681 A1 * | 12/2004 | Savage | G06F 30/30 706/19 |

(Continued)

*Primary Examiner* — Albert Decady
*Assistant Examiner* — Enamul M Kabir
(74) *Attorney, Agent, or Firm* — Patterson + Sheridan, LLP

(57) ABSTRACT

An apparatus and method therefor relate generally to a CRC engine. In such a CRC engine, a feed forward circuit is coupled to a feedback circuit. The feed forward circuit includes: an offset circuit configured to determine an offset value from header data; a look-up table circuit configured to select a seed value responsive to the offset value; a shifter circuit configured to successively load a zero padding and a payload in multiple byte blocks as aligned data with the zero padding leading the payload for a non-zero value of the offset value in a first of the multiple byte blocks having the zero padding and a first portion of the payload; and a CRC circuit configured to receive data zeroes to a seed port thereof and the aligned data to a data port thereof to provide an interim CRC value.

20 Claims, 9 Drawing Sheets

(56) References Cited

U.S. PATENT DOCUMENTS

| | | | |
|---|---|---|---|
| 2008/0228951 A1* | 9/2008 | Chow | H03K 19/1733 |
| | | | 710/10 |
| 2009/0316698 A1* | 12/2009 | Menten | H04L 47/10 |
| | | | 370/392 |
| 2010/0313104 A1* | 12/2010 | Bommena | H03M 13/09 |
| | | | 714/807 |
| 2010/0315965 A1* | 12/2010 | Nemeth | H04L 1/0083 |
| | | | 370/252 |
| 2012/0192044 A1* | 7/2012 | Shafai | H03M 13/091 |
| | | | 714/807 |
| 2014/0026022 A1* | 1/2014 | Hill | H04L 1/0061 |
| | | | 714/807 |
| 2016/0337083 A1* | 11/2016 | Englert | H04L 1/0061 |

\* cited by examiner

CYCLIC REDUNDANCY CHECK ENGINE AND METHOD THEREFOR

TECHNICAL FIELD

The following description relates to integrated circuit devices ("ICs"). More particularly, the following description relates to a cyclic redundancy check engine and method therefor for an IC.

BACKGROUND

In high-speed data communications, such as Ethernet or Infiniband® networks for example, a cyclic redundancy check ("CRC") may be used to detect an error in received data, such as an error introduced in the transmission of data. However, as data rates for transmission increase, speed of CRC generation becomes more problematic.

SUMMARY

An apparatus relates generally to cyclic redundancy check ("CRC") engine. In such an apparatus, there is a feed forward circuit coupled to a feedback circuit. The feed forward circuit includes: an offset circuit, a look-up table circuit, a shifter circuit, and a CRC circuit. The offset circuit is configured to determine an offset value from header data. The look-up table circuit is configured to select a seed value responsive to the offset value. The shifter circuit is configured to successively load a zero padding and a payload in multiple byte blocks as aligned data with the zero padding leading the payload for a non-zero value of the offset value in a first of the multiple byte blocks having the zero padding and a first portion of the payload. The CRC circuit is configured to receive data zeroes to a seed port thereof and the aligned data to a data port thereof to provide an interim CRC value.

A method relates generally to a cyclic redundancy check ("CRC"). In such a method, obtained is a data container having a payload. An offset value for the payload is determined. A zero padding is determined responsive to a non-zero value for the offset value. The payload is obtained from the data container. The zero padding and a first portion of the payload is loaded in an aligned format with the zero padding leading the first portion. An interim CRC value is determined for the first portion and the zero padding. A seed value is obtained responsive to the offset value. A selected value and the interim CRC value are modulo-two combined to provide an interim result. The interim result is accumulated to provide an interim output. A feedback value is determined responsive to the interim output. A selection is made as between the seed value and the feedback value to provide the selected value.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block-flow diagram depicting an exemplary previously known serial-to-parallel conversion flow.

FIG. 2 is a schematic diagram depicting an exemplary high-bandwidth cyclic redundancy check ("CRC") circuit.

FIGS. 3-1 and 3-2 (collectively FIG. 3) is a flow diagram depicting a design flow.

DETAILED DESCRIPTION

Figure 1:
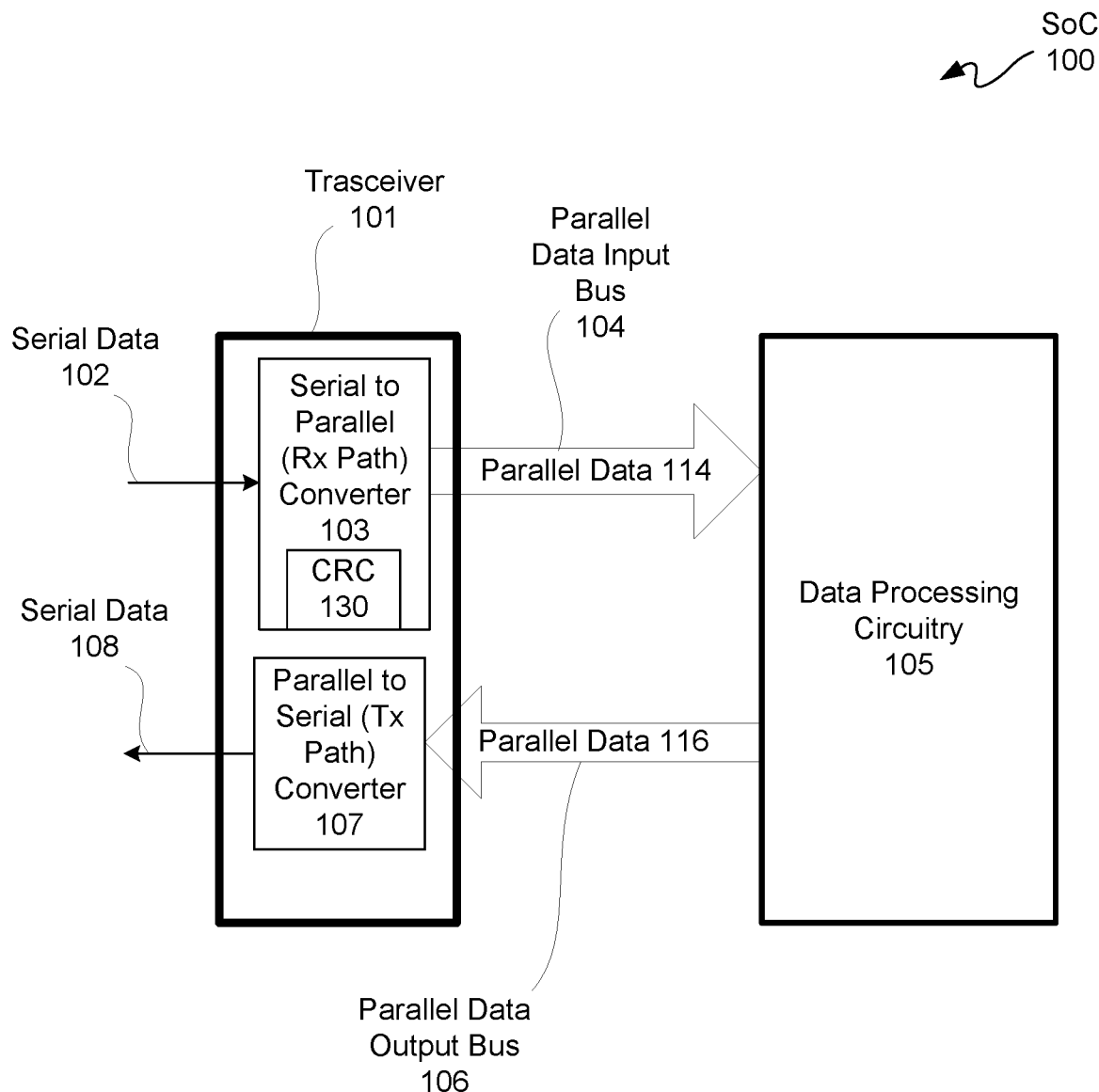
FIG. 1-1 is a block diagram depicting a system-on-chip ("SoC").

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A serial cyclic redundancy check ("CRC") linear feedback shift register ("LFSR") has been used in parallel, namely a parallel CRC LFSR, to increase throughput. However, to obtain a parallel CRC LFSR, a serial CRC LFSR is unrolled by looping a CRC determination for a number of iterations equal to input data bit width, namely data input vector width, for a CRC determination. Unfortunately, this looping may take significantly more time for larger input vector widths, which additional time can be too long for some high-speed network applications, such as 100 Gigabit per second Ethernet for example, to complete a CRC interim result in a single clock cycle of such a high-speed clock. In short, as clock frequencies increase, the time allowed for completing each CRC iteration in a single clock cycle becomes shorter, which exacerbates meeting timing constraints for a CRC determination for high-speed network applications.

In a CRC determination, there is a feedback path and a forward or feed forward path. Conventional pipelining or parallel techniques can fail to meet setup timing in a single cycle of a clock signal for high-speed network applications in a feedback path for a CRC interim determination. This failure may be due to having invalid bytes in a last block or beat of an input message, such as data payload of a packet, frame or other data transmission container, which may translate into additional logic levels and multiplexer stages in such a CRC feedback path. This failure may be made more severe in instances where an input data width to CRC logic is significantly wider than data payload of an input message or input data, leaving a number of invalid bytes for such an input.

As described below in additional detail, a CRC engine provides a feedback path more capable of readily handling wide input data vectors at high clock rates. Such a CRC engine uses an unfolded LFSR configured to handle such wide input data vectors at high clock rates.

With the above general understanding borne in mind, various configurations for a CRC are generally described below.

FIG. 1-1 is a block diagram depicting a system-on-chip ("SoC") 100. SoC 100 includes a transceiver 101 and data processing circuitry 105. Transceiver 101 includes a serial-to-parallel converter ("SPC") 103 in a receive ("Rx") path and a parallel-to-serial converter ("PSC") 107 in a transmit ("Tx") path. In another configuration, a receiver 101, which may or may not be part of a transceiver, may be used having an SPC 103. SPC 103 may include a high-bandwidth CRC engine 130, as described below in additional detail.

SPC 103 may be configured to receive serial data/serial data signal 102 in a serial clock domain and to convert such serial data received into parallel data/parallel data signal 114 for communicating on a parallel data input bus 104 to data processing circuitry 105 in a parallel clock domain. Data processing circuitry 105 may be configured to further process such parallel data 114 received in such a parallel clock domain, where such parallel clock domain is substantially slower than a serial clock domain associated with a serial side of SPC 103, namely a serial clock domain. Along those lines, a serial clock domain may have a clock frequency that is 128 times or more times faster than a clock frequency in a parallel clock domain.

Data processing circuitry 105 may further be configured to provide parallel data 116 via parallel data output bus 106 to PSC 107 at a parallel clock domain rate. PSC 107 may be configured to receive parallel data 116 and to convert such parallel data 116 received into serial data 108 for transmission in a serial clock domain.

For purposes of clarity by way of example and not limitation, approximately a 100 Gigabits per second ("Gbps") data rate is assumed for a serial clock domain. Continuing the example, each of serial data 102 received and serial data 108 transmitted may be at a 100 Gbps data rate. Additionally, for purposes of clarity by way of example and not limitation, approximately at least a 200 Mega Hertz ("MHz") clock rate is assumed for a parallel clock domain. Accordingly, parallel data 114 and parallel data 116 may each be clocked at a 200 MHz clock rate. Of course these and/or other data rates and/or clock rates may be used in other examples, where serial data is received at a substantially high rate prompting conversion to parallel data for processing by data processing circuitry 105 at a more manageable rate.

For the above non-limiting example, it is further assumed that each of parallel data input bus 104 and parallel data output bus 106 has at least a 512-bit parallel data path. Along those lines, serial data received 102 may be received at a data rate of 100 Gbps by SPC 103 and converted into parallel data 114, which parallel data 114 is clocked out of SPC 103 at 200 MHz in 512-bit wide beats or blocks. Data processing circuitry 105 may have a 200 MHz clock domain, as well as optionally one or more other slower clock domains, for processing parallel data 114.

Moreover, data processing circuitry 105 may have a 200 MHz clock domain for outputting parallel data 116 on parallel data output bus 106 to PSC 107. Parallel data 116 may be clocked into PSC 107 at a clock rate of 200 MHz in 512-bit wide beats. PSC 107 may convert such parallel data 116 into serial data 108 for transmission, such as at a data rate of 100 Gbps for example.

For conversion by SPC 103, there may be instances when a frame, packet, or other data container does not exactly align on a beat boundary, which in the above example is a 512-bit boundary. Thus, there may be instances where a last beat in a conversion to parallel data by SPC 103 includes less than 512-bits of data in the above example.

Figures 1, 2:
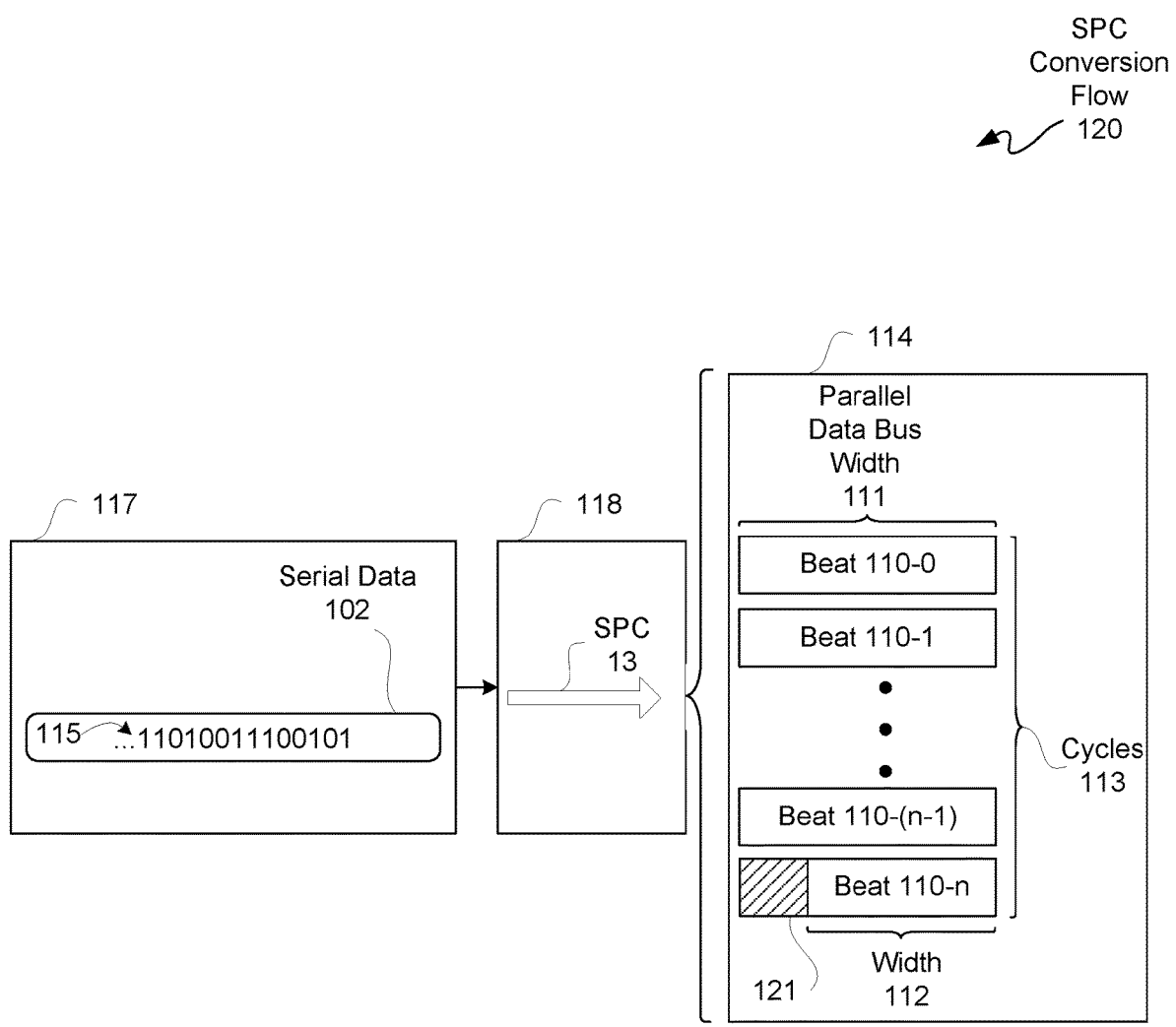
Figure 2:
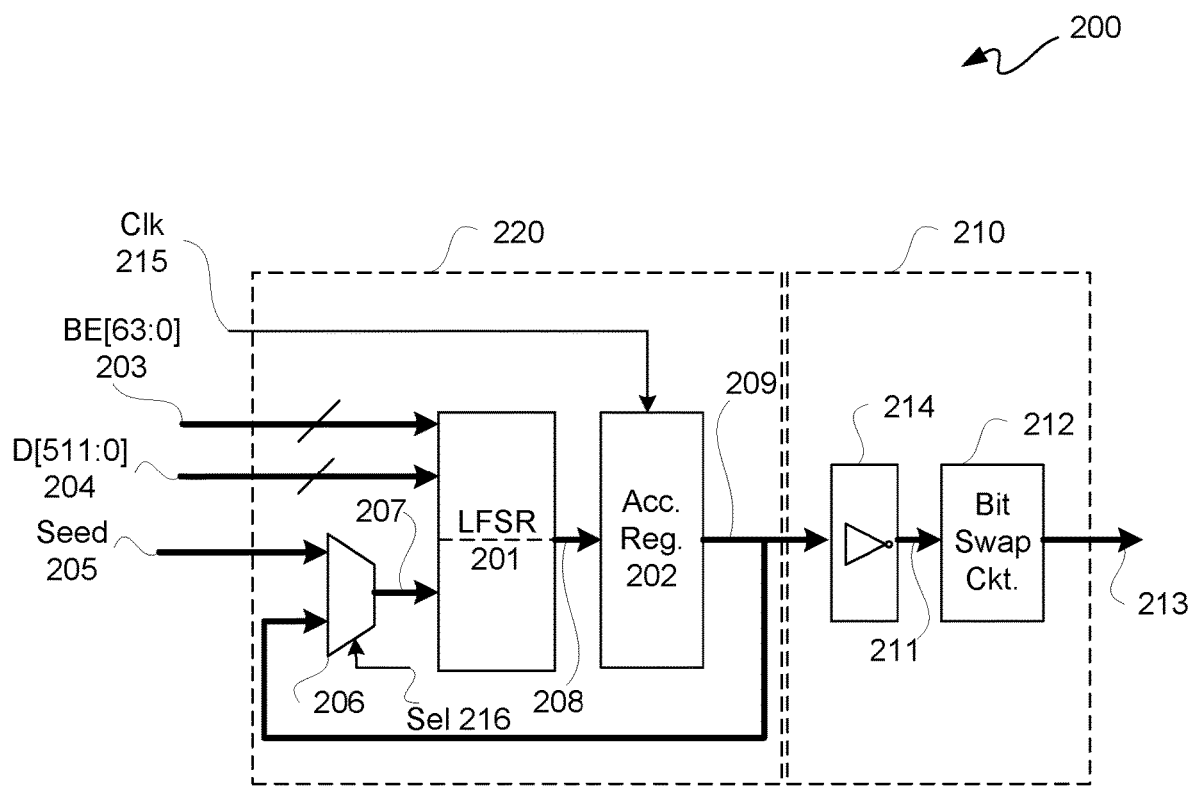

To describe conversion by a conventional SPC, FIG. 1-2 is a block-flow diagram depicting an exemplary previously known SPC conversion flow 120. At operation 117, serial data 102 is received by a conventional SPC 13. An example of a bitstream data payload 115 is provided in this example; however, this or any other bitstream may be used. Bitstream data payload 115 may be provided in a frame, packet, or other data container used in transmission of bits.

At operation 118, SPC 13 converts serial data 102 into parallel data 114. Parallel data 114 includes n+1 beats or data beats 110-0 through 110-$n$ for n a positive integer greater than zero in this example. It is possible that parallel data 114 may consist of a single beat or a subset of a single beat of data. However, generally parallel data 114 may be assumed to have more than one beat of data.

Beat 110-0 is a first beat converted over a first clock cycle of clock cycles 113. In this example, beat 110-0 has a beat width equivalent to parallel data bus width 111 of parallel data input bus 104. For the above example, a 512-bit bus data width is used; however, in another example this or another bus width may be used. Moreover, in the above example, a clock rate of 200 MHz for clock cycles 113 is used; however, in another example this or another clock rate may be used.

Beat 110-1 is a second beat converted over a second clock cycle of clock cycles 113, and so on down to a last beat 110-$n$. However, in this example, while each of beats 110-0 through 110-($n$−1) each have a bit width filling a parallel data bus width 111, beat 110-$n$ has a bit width 112 which is less than a full beat width, namely less than a parallel data bus width 111 in this example. So continuing the above example of 512-bit beats, for a data payload of a packet, frame, or other data container that is not an integer multiple of 512 bits, data of a last beat 110-$n$ does not exactly align to a beat boundary, namely in this example a last beat 110-$n$ is less than 512 bits or less than a beat. A beat is generally understood to be an entire width, whether or not all bits in such beat are valid.

A last beat 110-$n$ not perfectly aligned to a beat boundary means that such a beat may have one or more invalid bytes. In other words, there may be one or more bytes of data, for example an 8-bit byte, in a last beat 110-$n$ that is/are invalid. In other examples, other byte or word lengths may be used.

Continuing the above example of 512-bits per full beat, there may be 64 bytes of 8-bits each of data in a full beat. However, in a last beat 110-$n$, which is not exactly data aligned to a beat boundary, there may be one or more invalid bytes. This is generally indicated as an invalid region 121 of a last beat 110-$n$ of a data payload. As described below in additional detail, because a cyclic-redundancy check ("CRC") determination is performed, invalid region 121 is not padded. If invalid region 121 was padded, an erroneous CRC result might be obtained. Moreover, for this example, it is assumed that there are no incomplete bytes, namely each byte includes exactly 8 bits.

However, circuitry for SPC 13 to handle a last beat which may include one or more invalid bytes is complex. This complication makes generating a CRC interim result in a single clock cycle of a high-speed clock at least problematic, and not possible for some conventional SPCs 13.

For an SPC to operate while meeting timing constraints, such as for the above example or another high communication speed example, for a CRC interim computation in a single clock cycle, an SPC 13 may be replaced with an SPC 103 of FIG. 1-1, where SPC 103 may include a high-bandwidth CRC engine 130, as described below in additional detail.

FIG. 2 is a schematic diagram depicting an exemplary high-bandwidth CRC circuit 200. High-bandwidth CRC circuit 200 may be used for high-bandwidth CRC engine 130 of FIG. 1-1. Even though single lines are depicted in some instances for signal busses for purposes of clarity, such lines may represent single or multiple line signal busses in accordance with the description herein.

High-bandwidth CRC circuit 200 includes a feed forward path 210 and a recursive- or feedback-feed forward path ("recursive path") 220. Feed forward path 210 may be used for processing an interim CRC value obtained from recursive processing via recursive path 220, where after a number of clock cycles such interim CRC value may be a final interim CRC value for processing by feed forward path 210 to obtain a final CRC value for a then current payload.

Feed forward path 210 may include inverter circuitry 214 coupled to receive interim CRC output values ("interim CRC values") 209 from recursive path 220. Bit swap circuitry 212 of feed forward path 210 may be coupled to receive an inverted output 211 of inverter circuitry 214. Bit swap circuitry 212 may be configured to provide a CRC result output 213. As feed forward path 210 does not present timing issues associated with recursive path 220, feed forward path 210 may be conventional, and thus is not described in unnecessary detail herein.

Recursive path 220 includes a multiplexer 206, a linear feedback shift register ("LFSR") 201, and an accumulation register 202. LFSR 201 is an unfolded LFSR. As described in additional detail below, LFSR 201 may be bifurcated into a first and a second CRC circuit, namely respectively a first and a second LFSR 201 as generally indicated with a dashed line through LFSR 201.

Continuing the above example, unfolded LFSR 201 may be unfolded to 512-bits. Unfolded LFSR 201 may be configured to receive a byte valid or byte enable signal (BE) 203 and a data input/input data signal (D) 204. Continuing the above example, byte enable signal 203 may be 64-bits wide, namely from bits 0 to 63 or BE[63:0], and data signal 204 may be 512-bits wide, namely from bits 0 to 511 or D[511:0]. However, these and/or other values may be used in other examples.

Unfolded LFSR 201 may be configured to provide a shift register output 208 for input to accumulation register 202. Accumulation register 202 may be configured to be cyclicly responsive to clock signal 215 to register and accumulate shift register output 208 to provide a current or updated accumulated value, namely an interim CRC output value 209.

A current accumulated interim CRC output value 209 may be fed back as a seed input to multiplexer 206. Another seed input to multiplexer 206 may be an initial seed value signal 205. Output 207 from multiplexer 206 may be selected responsive to a select signal 216. For an initial clock cycle for a CRC on a message, initial seed value signal 205 may be selected by select signal 216, and subsequent seed values may be provided via a recursive path as selected by select signal 216.

As described below in additional detail, recursive path 220 is made more suitable to being pipelined in order to meet timing constraints by removing "whole" logic, namely parsing operations, as described below in additional detail. As previously described, as size of an input vector, namely data width of a beat input via input data signal 204, and/or frequency of clock signal 215 increases in an implementation, meeting timing constraints becomes more problematic. However, unfolded LFSR 201 is scalable with vector size. Moreover, unfolded LFSR 201 is scalable for increased frequency of clock signal 215. Additionally, unfolded LFSR 201 is configured to handle beat aligned as well as non-beat aligned data payloads. Again, a non-beat aligned data payload is for a last beat or block of data of a data payload not spanning an entire data vector input width as previously described.

However, before further describing recursive path 220, including further description of unfolded LFSR 201, properties of a CRC determination are further described in order to more completely understand configuration of recursive path 220.

Figures 1, 3:
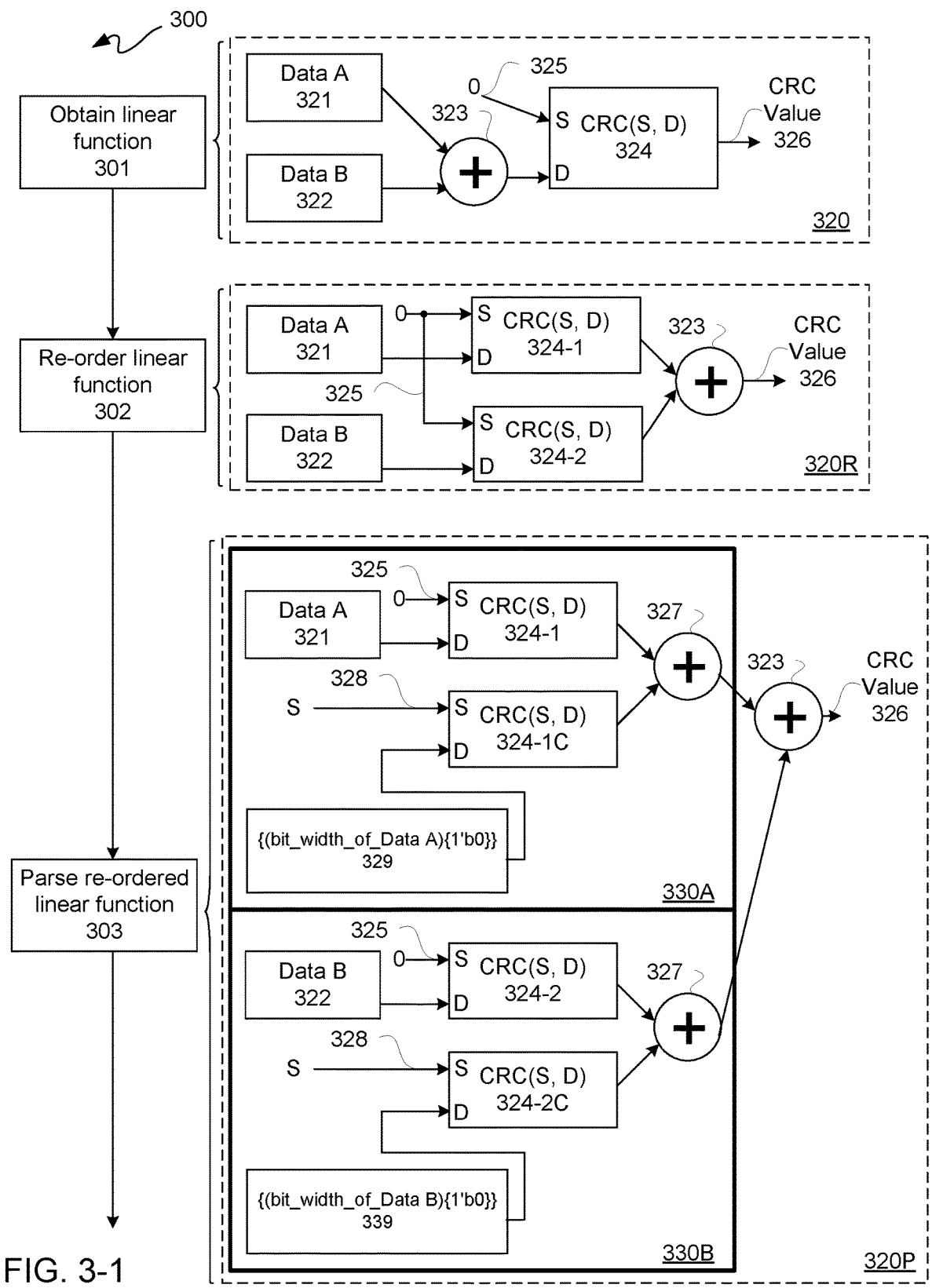
Figures 2, 3:
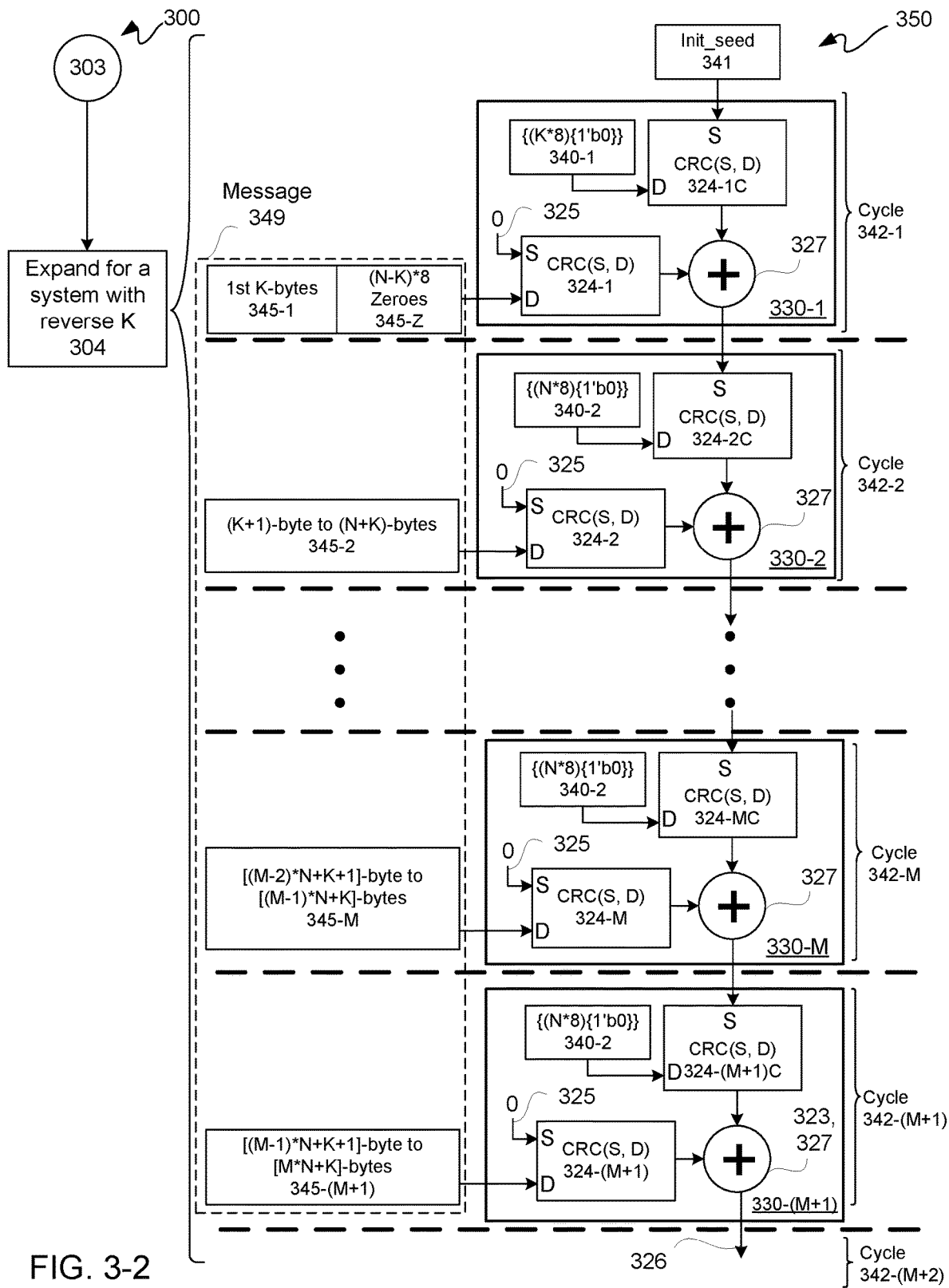

FIGS. 3-1 and 3-2 (collectively FIG. 3) is a flow diagram depicting a design flow 300. Design flow 300 may be used for designing a portion of a CRC engine 130 of FIG. 1-1. Even though single lines are depicted for signal busses for purposes of clarity, such lines may represent single or multiple line signal busses in accordance with the description herein.

At operation 301, a linear function may be obtained. As is known, a CRC is a linear function, such as by only including modulo-2 operations. Modulo-2 operations may be implemented as corresponding exclusive-OR circuits ("XORs" or "XOR operators").

A high-level example of a circuit for a CRC function is provided corresponding to operation 301. In this example, a polynomial, which in this example may be expressed as a CRC function of data, D, and seed value, S, namely CRC(S, D), is obtained at 301. For a CRC circuit 320, Data A 321 and Data B 322 may be provided to XOR gate circuit/XOR 323 to provide a data input, D, to a CRC(S, D) circuit 324. In order to compute a CRC value over a combination of Data A and Data B values, such values may be combined modulo-2.

As is known, a polynomial may be implemented in a circuit, such as CRC(S, D) circuit 324, with a conventional LFSR and one or more XORs depending on the polynomial. A seed value 325, which in this example is 0 or data bit zeroes, may be provided as a seed input, S, to CRC(S, D) circuit 324. CRC(S, D) circuit 324 responsive to D and S inputs may provide a CRC value 326 as an output.

At operation 302, a re-ordering of such linear function obtained at 301 may be performed. Continuing the above CRC example, position of a CRC function and an XOR operator may be reversed, namely are interchangeable, for a seed value of 0.

This interchangeability may be mathematically expressed as a Property 1 as follows: CRC(0, A^B)=CRC(0, A)^CRC(0, B), where "^" indicates a modulo-2 operation, such as may be implemented with an XOR. This means for a seed value of 0, a CRC function may be replicated for receiving a same seed value and respectively receiving Data A and Data B, and outputs of such CRC replicated functions may be combined modulo-2 to obtain a CRC value.

Using Property 1, CRC circuit 320 may be re-ordered to provide a CRC circuit 320R. In CRC circuit 320R, Data A 321 and Data B 322 are respectively input to data ports D of CRC(S, D) circuits 324-1 and 324-2, which may be duplicates of one another. A seed value 325 of 0 is input to a seed port S of each of CRC(S, D) circuits 324-1 and 324-2. Respective outputs of CRC(S, D) circuits 324-1 and 324-2 are input to XOR 323, and output of XOR 323 may be a CRC value 326, the same as in CRC circuit 320.

Thus, at operation 302, an XOR may be moved to an output side of CRC functions. Moreover, after re-ordering at operation 302, CRC functions may be replicated to independently operate though both have a same seed value input of 0.

At operation 303, a re-arranged or re-ordered linear function of operation 302 may be parsed to have an ability to have different seed values, where only one of such seed values is set to a 0. This parsing may be mathematically expressed as a Property 2 as follows: CRC(S, D)=CRC(S, {(bit_width_of_D){1'b0}})^CRC(0, D), In other words, a CRC(S, D) function may be parsed into two CRC functions in accordance with Property 2.

Using Property 2, CRC circuit 320R may be parsed to provide a CRC circuit 320P, which includes CRC circuits 330A and 330B. For example, Data A 321, seed value 325 of 0, and CRC(S, D) circuit 324-1 may be the same in CRC circuit 320R and CRC circuit 320P. However, in contrast to re-ordered CRC circuit 320R, CRC circuit 320P includes another instance of CRC(S, D) circuit 324-1, which CRC(S, D) circuit 324-1C may be a copy of CRC(S, D) circuit 324-1. However, CRC(S, D) circuit 324-1C has a seed value 328 input S, which may be a non-zero value, and a data value input 329. This data value input 329 is a bit width of Data A multiplied by a logic 0. Effectively, this data input 329 is all logic 0s for a bit width of Data A. If Data A was XOR'd with data input 329, a result of such XOR'ing would be Data A.

In other words, a top CRC function, namely CRC(S, D) circuit 324-1, in CRC circuit 330A is independent of a bottom CRC function, namely CRC(S, D) circuit 324-1C, other than having a common data width of Data A 321. A bottom CRC function in CRC circuit 330A is dependent on seed value S, as data inputs to such bottom CRC function are all 0s. In effect, a top CRC function in CRC circuit 330A may be only dependent on values of Data A 321, and a bottom CRC function in CRC circuit 330A may be only dependent on values of seed value S 328.

For CRC circuit 330A, outputs of top and bottom CRC function circuits, namely respectively CRC(S, D) circuits 324-1 and 324-1C, may be output to an XOR 327. For CRC circuit 320P, there may be a corresponding CRC circuit 330B, which corresponds to CRC circuit 330A though for Data B 322. For purposes of clarity and not limitation, CRC circuit 330B is not described in the same detail as CRC circuit 330A, as such description would be a repeat of the description for CRC circuit 330A though for Data B 322, CRC(S, D) circuits 324-2 and 324-2C, a data input 339 for width of Data B 322, and another XOR 327.

Outputs of XORs 327 respectively of CRC circuits 330A and 330B may be input to XOR 323 to output a CRC value 326. Such CRC value 326 output in CRC circuit 320P may be accumulated by an accumulation register 202, and output of such accumulation register 202 may be fed back as part of a recursive path of a CRC circuit 200, as described below in additional detail.

Data A 321 and Data B 322 may be same or different values, and data widths thereof may be same or different. However, for Data A 321 and Data B 322 of a same message, where such message has a CRC value, CRC circuits 330A and 330B may be chained together, such that for example a seed value S 328 of an immediate downstream CRC circuit 330B with respect to CRC circuit 330A may be output of XOR 327 of CRC circuit 330A. A final stage XOR may thus be in effect XOR 323 for outputting a CRC value 326 result for such a message.

Along those lines, at operation 304, re-ordering and parsing respectively at operations 302 and 303 may be expanded for a system though with left alignment of an input message 349. This may be thought of as a K bytes placeholder swapped from an end of a message 349 to a beginning of message 349. A system may have an input block size to a CRC engine 130 of N bytes. However, a message length for such system may be L bytes, for a total message of N*L bytes. However, as previously described, there may be instances where a last K byte or bytes of a message of L bytes does not exactly end at an input block size of N bytes.

Message length L may be considered to be equal to (M*N+K) bytes, where: L, M, N and K are all positive integers; K is bounded as $1 \leq K \leq N$; M+1 is a number of iterations to determine a CRC of message length L, and K is a last byte size for a message of length L. In other words, Properties 1 and 2 may be used for unfolding and expanding a system configured to recursively determine a CRC value over a message of length L in (M+1) iterations, where a CRC value may be output on an M+2 iteration. Additionally, K may equal N in some instances, namely exact beat or block size alignment in some instances; however, in other instances K may be less than N though a minimum of 1.

Along those lines, CRC circuit 350 may be a chained expansion using repeated instances of parsed CRC circuits 330. An initial seed value 341 may be determined for a message of length L. Such an initial seed value 341 may be a constant as defined by a protocol link layer specification.

This initial seed value 341 may be provided to a seed port S of a CRC(S, D) circuit 324-1C of a first stage parsed CRC circuit 330-1. A data port D of CRC(S, D) circuit 324-1C may be coupled to receive a data input value register 340-1 output according to {(K*8){1'b0}}, namely all zeros for K bytes of 8-bits each.

As previously described, K can equal any integer value from 1 to N bytes. Optionally, determination of K may be made by dividing a data payload by N, or as described below.

Seed value 325 of 0 may be provided to a seed port S of a CRC(S, D) circuit 324-1 of a first stage parsed CRC circuit 330-1. A data port D of CRC(S, D) circuit 324-1 may be configured to receive a data input of a first K-bytes 345-1 of a message 349 of length L and (N−K)*8 zeroes or zero padding 345-Z. For K equal to N, there are no zeroes 345-Z; however for K less than N, there will be zeroes 345-Z.

A value for K indicates a last block size for a message 349 of length L, which value may be used as a placeholder to obtain first, not last, bits of a message. However, (N−K)*8 zeroes 345-Z are loaded before first K-bytes 345-1 in order to preserve a CRC value. Along those lines, one or more zeros may be passed earlier to passing data without altering a result of a CRC function for such data. In other words, data port D of CRC(S, D) circuit 324-1 processes (N−K)*8 zeroes 345-Z as leading first K-bytes 345-1 in order to preserve a CRC value. For first K-bytes 345-1 and (N−K)*8 zeros 345-1 loaded in parallel, in order to preserve a CRC value, (N−K)*8 zeroes 345-Z may appear as least significant bits or LSBs in this example. Additionally, when both a seed and data of 0 are input to a CRC(S, D) function, output of such CRC(S, D) function is 0.

As previously described, N-bytes may be width associated with a parallel data input bus. Though an 8-bit parallel data input bus may be used, it is assumed for purposes of clarity and not limitation that such a parallel data input bus is at least two or more bytes wide in accordance with high-bandwidth communication applications.

Outputs of CRC(S, D) circuit 324-1 and CRC(S, D) circuit 324-1C may be provided as respective inputs to XOR 327 of first stage parsed CRC circuit 330-1. Operations for first stage parsed CRC circuit 330-1 may be conducted in a first clock cycle 342-1 of a clock signal, such as clock signal 215 of FIG. 2 for example. Output of XOR 327 may be provided as a seed value to a next stage, such as to a seed port of CRC(S, D) circuit 324-2C of second stage parsed CRC circuit 330-2.

Second stage parsed CRC circuit 330-2 is a repeat or copy of first stage parsed CRC circuit 330-1. However, second stage parsed CRC circuit 330-2 is configured to receive on a data port D of CRC(S, D) circuit 324-2 a (K+1)-byte to (N+K)-bytes 345-2 of a message 349 of length L. Also, a data port D of CRC(S, D) circuit 324-2C may be coupled to receive a data input value register 340-2 output according to $\{(N*8)\{1'b0\}\}$, namely all zeros for N bytes of 8-bits each. Recall in the above example, N is equal to 64, as 64*8-bits equals 512 bits.

Effectively, whether K or N is a data input to a data register may be selected responsive to a byte valid signal. For each second to (M+1)th stage parsed CRC circuit 330, data register 340-2 may be configured for N. Operations for second stage parsed CRC circuit 330-2 may be conducted in a second clock cycle 342-1 of a clock signal, such as clock signal 215 of FIG. 2 for example.

Such parsed CRC circuits 330 may be copied and chained together for progressively receiving corresponding bytes of a message 349 of length L down to Mth stage parsed CRC circuit 330-M for receiving from a [(M−2)*N+K+1]-byte to [(M−1)*N+K]-bytes 345-M of message 349. Operations for Mth stage parsed CRC circuit 330-M may be conducted in an Mth clock cycle 342-M of a clock signal, such as clock signal 215 of FIG. 2 for example.

A last or (M+1)th stage parsed CRC circuit 330-M+1 may have operations conducted on an (M+1)th clock cycle 342-M of a clock signal, such as clock signal 215 of FIG. 2 for example. A seed value may be provided to a seed port S of a CRC(S, D) circuit 324-(M+1)1C of an (M+1)th stage parsed CRC circuit 330-(M+1). A data port D of CRC(S, D) circuit 324-(M+1)1C may be coupled to receive a data input value register 340-2 according to $\{(N*8)\{1'b0\}\}$, namely all zeros for N bytes of 8-bits each. Thus, clock cycles 113 of a clock signal 215 may span a payload length L of a payload of a packet or other data container. Such clock cycles 113 are thus related to payload length loaded in multiple byte blocks 620.

Again, a seed value 325 of 0 may be provided to a seed port S of a CRC(S, D) circuit 324-(M+1) of (M+1)th stage parsed CRC circuit 330-(M+1). A data port D of CRC(S, D) circuit 324-(M+1) may be configured to receive a data input of a [(M−1)*N+K+1]-byte to [M*N+K]-bytes of a message 349 of length L.

Outputs of CRC(S, D) circuit 324-(M+1) and CRC(S, D) circuit 324-(M+1)C may be provided as respective inputs to an XOR 323/327 of last stage parsed CRC circuit 330-(M+1). Operations for (M+1)th stage parsed CRC circuit 330-(M+1) may be conducted in an (M+1)th clock cycle 342-(M+1) of a clock signal, such as clock signal 215 of FIG. 2 for example. Output of XOR 323/327 may be provided as a CRC value 326 result for a message 349 of length L on an (M+2)th clock cycle 342-(M+2).

Figure 4:
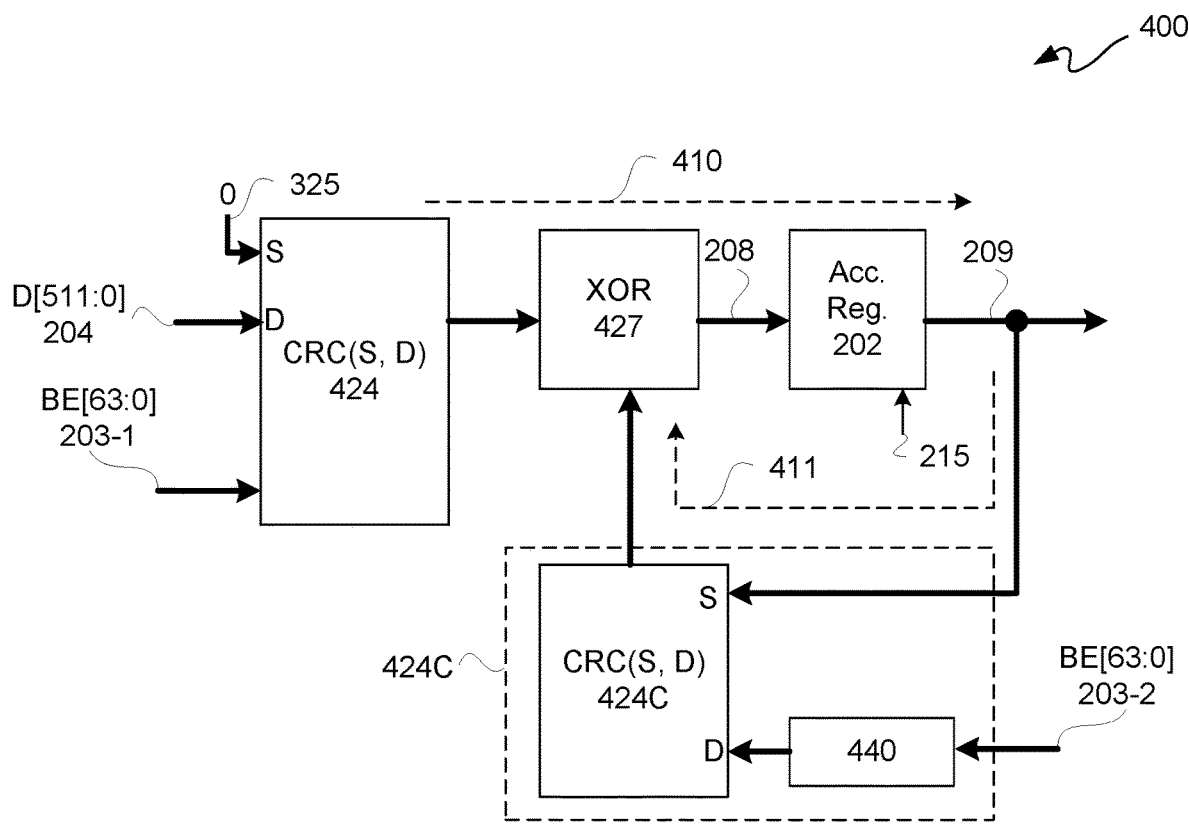
FIG. 4 is a block diagram depicting an exemplary feed forward and recursive path.

With reference to FIG. 4, there is shown a block diagram depicting an exemplary feed forward and recursive path 400. Feed forward and recursive path 400 may be used for recursive path 220 of FIG. 2.

Along those lines, CRC(S, D) circuit 424 is moved from a recursive or feedback path 411 to a feed forward path 410. CRC(S, D) circuit 424C remains on a feedback path 411. This helps meet timing constraints as only a portion of a CRC function remains on a recursive path. Circuits 424 and 424C may be implemented as respective unfolded LFSRs, previously generally represented as LFSR 201 of FIG. 2.

Feed forward and recursive path 400 may be another outcome of an expansion for a system at operation 304 of FIG. 3. With simultaneous reference to FIGS. 1-1 and 2 through 4, feed forward and recursive path 400 is further described.

CRC(S, D) circuit 424 may be a CRC(S, D) circuit 324-M. CRC(S, D) circuit 424 may be configured to receive data input/input data signal 204, as well as a seed signal 325 of a number of 0s. Byte valid or byte enable signal 203-1 may be used to indicate whether N or K bytes are valid for each beat of data input signal 204 input on a clock cycle of clock signal 215. Byte valid or byte enable signal 203-1 may be used to determine how many 0s of a seed signal 325 are to be used on a clock cycle by CRC(S, D) circuit 424. Byte valid or byte enable signal 203-1 may be used to select K bytes 345-1 and (N−K)*8 Zeroes 345-Z for a first beat. After such first beat, each subsequent beat may be an increment of N-bytes from the end of a previous beat.

Output of CRC(S, D) circuit 424 may be provided as an input to XOR circuit 427, which may be an XOR 327. Output of XOR circuit 427 may be an output of an unfolded LFSR 201, configured to be cyclicly responsive to clock signal 215 to provide a shift register output 208 for input to accumulation register 202. Accumulation register 202 may be configured to be cyclicly responsive to clock signal 215 to register and accumulate shift register output 208 to provide a current accumulated value output 209.

A current accumulated value output or interim CRC output 209 may be fed back as a seed input to CRC(S, D) circuit 424C. CRC(S, D) circuit 424C may be a CRC(S, D) circuit 324-M. CRC(S, D) circuit 424C may optionally include data register and select circuitry 440 configured for storing data input values of data registers 340-1 and 340-2 and for selecting either of such data input values responsive to byte valid or byte enable signal 203-2, which may be used to indicate whether N or K bytes are valid for each beat of a recursive clock cycle of clock signal 215. As a recursive path byte valid signal 203-2 may lag a feed forward path byte valid signal 203-1, a same reference number 203 with either a −1 or a −2 is used to delineate this difference between such signals.

Output of CRC(S, D) circuit 424C may be provided as another input to XOR circuit 427. Output of XOR circuit 427 may be an output of an unfolded LFSR 201, configured to be cyclicly responsive to clock signal 215 to provide a shift register output 208, which is XOR'd by a current beat from CRC(S, D) circuit 424 and a previous beat from CRC(S, D) circuit 424C, for input to accumulation register 202. Again, accumulation register 202 may be configured to be cyclicly responsive to clock signal 215 to register and accumulate shift register output 208 to provide a current accumulated value output 209.

Continuing the above example, a first beat of 512 bits may be processed by CRC(S, D) circuit 424. Output of CRC(S, D) circuit 424 may be provided to XOR circuit 427, and output of XOR circuit 427 may be provided to accumulation register 202. However, such first beat may be K bytes of a message 349 followed by (N−K)*8 zeroes. Such processed first beat resulting in an interim CRC value accumulated in accumulation register 202 may then be processed on a next clock cycle by CRC(S, D) circuit 424C for feedback output to XOR circuit 427. A second beat from a (K+1)-byte to (N+K)-bytes of a message 349 may be processed on such next clock cycle by CRC(S, D) circuit 424. Accordingly, at this juncture, XOR circuit 427 may XOR a second processed beat output from CRC(S, D) circuit 424 with a first beat processed through to output from CRC(S, D) circuit 424C.

However, by having CRC(S, D) 324-(M+1)C be able to operate on a block input size boundary, such as a value of {(N*8){1'b0}} for a data value input register 340-2, rather than for any value of K, complexity on a recursive path is reduced. In other words, only a first stage parsed CRC circuit 330-1 has a variable byte length or bit length, all other subsequent parsed CRC circuit 330 stages have fixed byte or bit lengths. Accordingly, this variability, shifted to a first cycle from a last cycle, may optionally be used for a further simplification of a recursive path as described below in additional detail.

Figure 5:
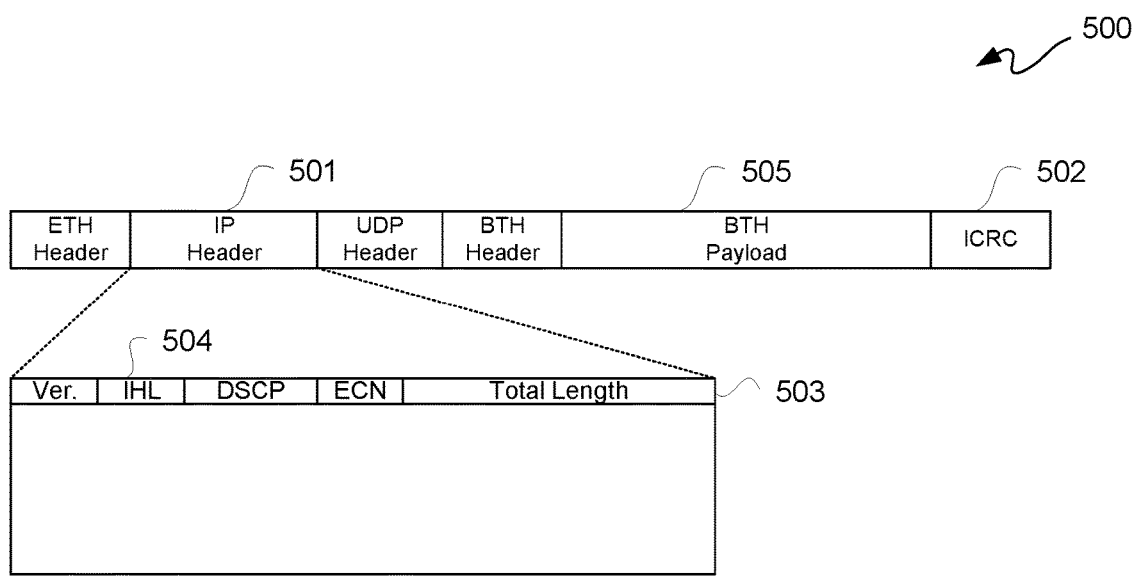
FIG. 5 is a block diagram depicting an exemplary conventional packet.

FIG. 5 is a block diagram depicting an exemplary conventional packet 500. Even though a packet 500 is used for purposes of clarity by way of non-limiting example, another type of data container 500 may be used for transmission and reception of data in other examples.

Packet 500 includes header fields, a payload field 505, and an ICRC value field (Invariant Cyclic Redundancy Check) 502, as is known. Internet Protocol ("IP") header field 501, such as an IPv4 header for example, includes, among other values, a total length value 503 which indicates total length of payload (data) and header of a packet 500 in bytes. A minimum size of an IPv4 packet 500 is 20 bytes, namely header without data. However, an IHL or Internet Header Length field 504 indicates total length of a header of an IPv4 packet 500.

For example, a value of a total length value 503 less and an IHL value 504 in the example of an IPv4 packet 500 may be divided by N in order to obtain K. Maximum size, header and payload, of an IPv4 packet 500 is 65,535 bytes. However, generally a protocol may limit this value to a lesser number, such as 9,216 bytes for example.

Though the example of an IPv4 packet 500 is used, other data containers, including without limitation other types of IP packets, may be used. This is just one example for determining a value for K, and other data containers may include other indicators including without limitation data payload length. Moreover, other data containers may contain a fixed or variable length.

Figure 6:
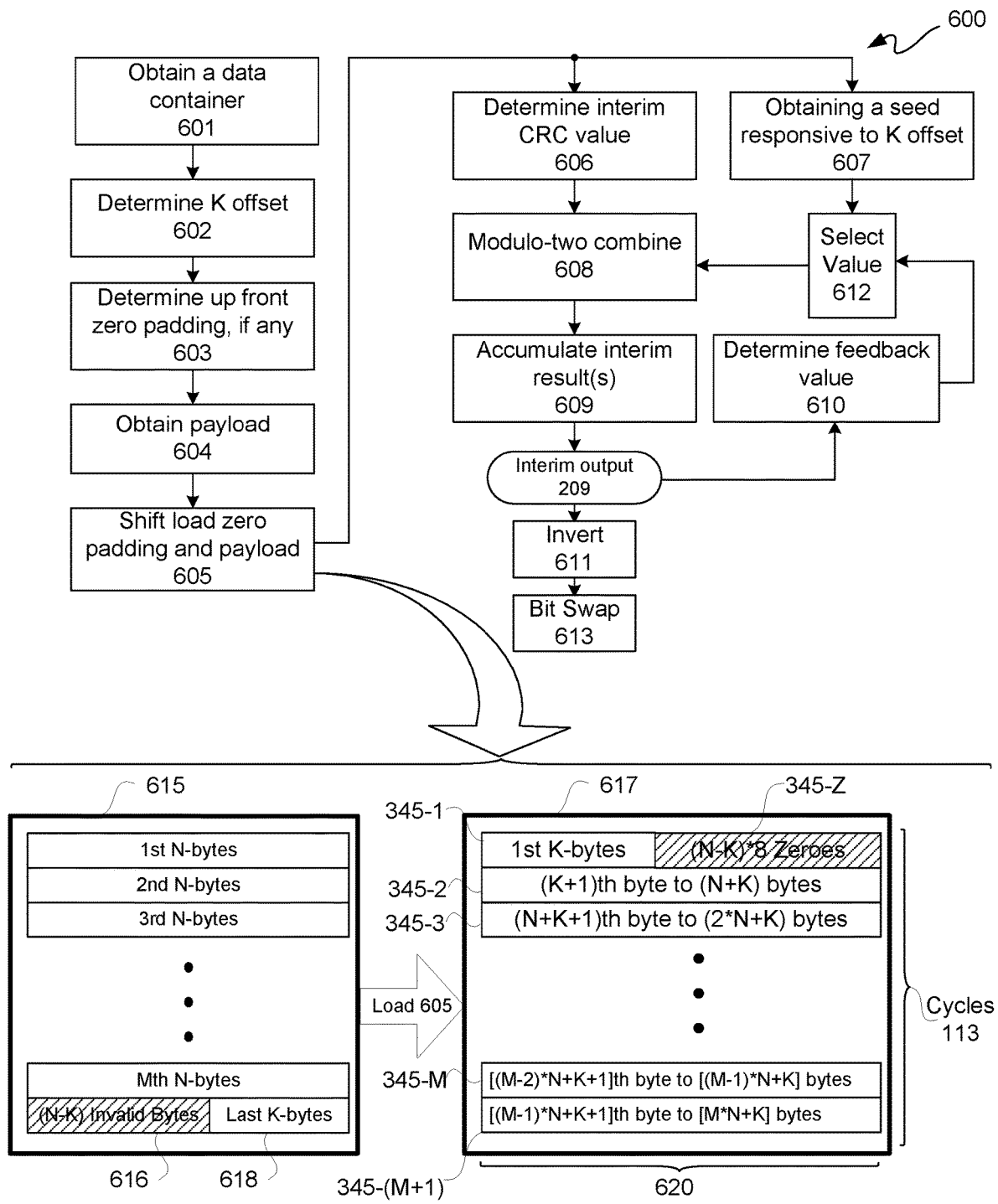
FIG. 6 is a flow diagram depicting an exemplary alignment-load and CRC output flow.

FIG. 6 is a flow diagram depicting an exemplary alignment-load and CRC output flow 600. Alignment-load and CRC output flow 600 is further described with simultaneous reference to FIGS. 1-1 and 2 through 6. In this example, alignment in flow 600 is a left alignment; however, in another example, a right alignment may be used in flow 600.

At 601, a data container may be obtained. For purposes of clarity by way of example and not limitation, it shall be assumed that a data container obtained at 601 is a packet 500; however, other types of data containers may be used.

At 602, a value for a K offset may be determined. Again, K may be determined from information in a header of packet 500. Optionally, payload length L may be determined at 602.

At 603, up front zero padding, if any, may be determined or selected responsive to a K offset determined at 602. Again, such up front zero padding may be determined as (N−K)*8 Zeroes 345-Z for the example of an 8-bit byte.

Moreover, even though a unit of bytes is used, other units of data may be used, such as octets, words, or other data unit.

At 604, payload 615 may be obtained from a packet 500. Such payload 615 may have one or more chunks of N-bytes, followed by a last K-bytes 618, which may be followed by (N−K) invalid bytes 616.

At 605, zero padding 345-Z and payload 615 may effectively be shift loaded, such as for a right or left alignment. For purposes of clarity by way of example and not limitation, a left alignment is assumed.

Such zero padding 345-Z and payload 615 may be shift loaded at operation 605 into a CRC(S, D) circuit 424 in a left-aligned form, namely left-aligned payload 617. In another example, payload 615 may be re-arranged in a left aligned form 617, and then loaded in such pre-aligned left-aligned form 617. Such re-arranging may be performed by a receiver after reception of payload 615 or in a transmitter prior to transmission of payload 615.

Furthermore, shift loading at operation 605 may be performed by just reading from memory based on addresses for obtaining a first K bytes 345-1 for such left alignment. Such read from memory may occur after loading of generated zeros 345-Z; however, this may be reversed depending on implementation. Thereafter, addresses may be incremented for subsequent reads from memory for successively obtaining bytes 345-2, 345-3, . . . , 345-M, and 345-(M+1). Thus, left-aligned payload 617 may remain in original form in memory though read out via data input signal 204 in a left-aligned format. Again, a left-aligned format is used, so leading zeros 345-Z do not upset a CRC outcome. Continuing the above example, because a payload 615 includes invalid bytes 616, K does not equal N in this example, meaning that such payload 615 does not have a 512-bit alignment for a final chunk of data.

A CRC(S,D) operation of feed forward path may be configured to receive aligned payload data to a data input port thereof to determine an interim CRC value at operation 606. At operation 607, an offset K may be provided to a look-up table of feed forward path as a vector input K for a table look-up, namely looking up a seed value. Interim CRC values may each be provided as a data input to a modulo-two operator for a modulo-two combine operation with a seed value or a feedback value at operation 608.

Along those lines, a modulo-two output may be provided as an interim CRC value to an accumulator at operation 609 to accumulate interim results. Such accumulator may provide an interim CRC value output 209 to a CRC(S,D) operation of a recursive path to determine a feedback value at operation 610. At operation 612, a selection between seed and feedback values may be performed to select a selected value for a modulo-two combine operation at 608.

Figure 7:
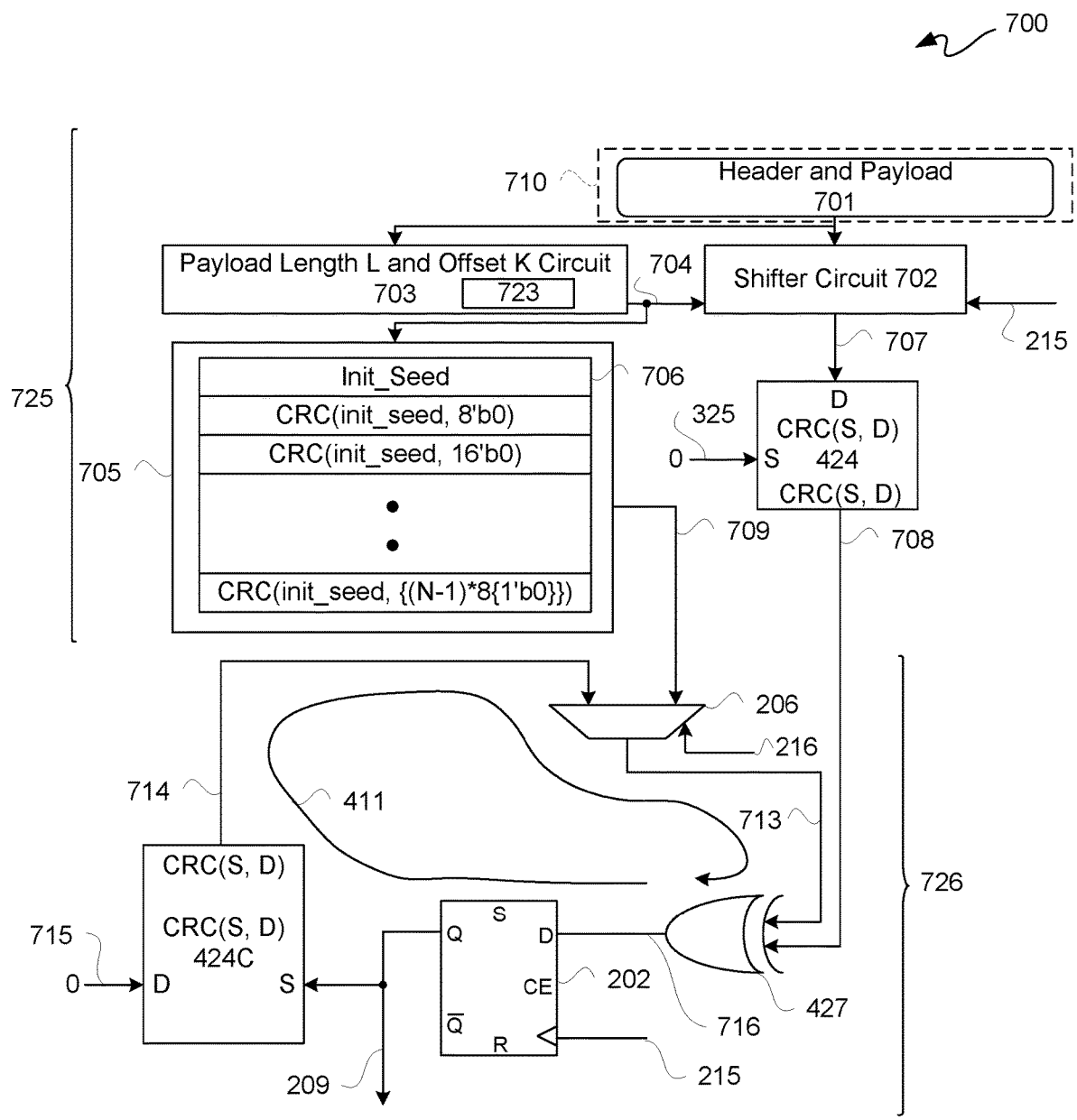
FIG. 7 is a block-circuit diagram depicting an exemplary unfolded forward and recursive path circuit.

Additional details regarding alignment-load and CRC output flow 600 are described more tangibly with reference to the block-circuit diagram of FIG. 7. FIG. 7 is a block-circuit diagram depicting an exemplary unfolded forward and recursive path circuit 700. Unfolded forward and recursive path circuit 700 may be used for forward and recursive path 400. Again, even though single lines are illustrated for clarity, such lines may be for one or more signal lines of a signal buss. Unfolded forward and recursive path circuit 700 is further described with simultaneous reference to FIGS. 1-1 and 2 through 7.

Unfolded forward and recursive path circuit 700 may be configured to receive packets, frames or other input data containers, such as may include a header and payload data 701. Unfolded forward and recursive path circuit 700 may be configured to load N-bytes of payload data of such header and payload data 701 on each cycle of a clock signal 215 of a data container obtained at operation 601. Along those lines, a feed forward circuit 725 of unfolded forward and recursive path circuit 700, which optionally may include packet buffer memory 710, may be configured to read header and payload data 701 from packet buffer memory 710, buffer such read data, and provide such header and payload data read, as described below in additional detail.

A payload length L and offset K circuit 703 of feed forward circuit 725 may be configured to receive header data of data 701 from buffer memory 710 to determine, such as at operation 602, a payload or message length L and an offset K therefrom as previously described. Payload length L and offset K circuit 703 may include a processor; however, a logic-register circuit 723, which may include a subtractor or an adder, may be used to determine L and K. Payload length L and offset K circuit 703 may be configured to output a value for K, namely an offset value 704, and optionally may be configured to output a value for L along with K, as output signal 704. Payload length L may be used to determine a number of clock cycles used to process beats or blocks of a payload, as previously described.

Output signal 704 may be provided to a look-up table circuit 705, such as for example table memory 705, of feed forward circuit 725 as a vector input K for a table look-up operation at 607. In this example, a ROM is used for table memory 705; however, another type of look-up table memory may be used. Responsive to a value for K, a seed value may be selected from seed values of a look-up table 706 stored in table memory 705. In this example, seed values of a look-up table 706 include an initial seed value, CRC(init_seed, 8'b0), CRC(init_seed, 16'b0), . . . , CRC(init_seed, {(N−1)*8{1'b0}}). A selected seed value 709 may be output from table memory 705. Again, zero padding may be determined or selected as a seed value 709 at operation 603.

Such selected seed value 709 may be output for use for just a first clock cycle of clock signal 215 for a current payload, such as of a packet for example. For subsequent clock cycles of clock signal 215 for processing a current payload of a packet, a select signal 216 may select a feedback signal or value rather than a selected seed value for recursive processing.

Output signal 704 may be provided to shifter circuit 702 of feed forward circuit 725. Shifter circuit 702, continuing the above example clocked by clock signal 215, may be configured for left shifting responsive to K of output signal 704 for an initial N-byte beat or block of a payload obtained at operation 604. Shifter circuit 702 may be configured to load N-byte beats or blocks, valid and/or invalid, of payload data from data 701 on each cycle of a clock signal 215 to provide aligned payload data 707 at operation 605. Chunks of N-bytes each, which are left aligned in this example by left-shifting logic of shifter circuit 702, may be output from shifter circuit 702 as left-aligned payload data 707.

However, responsive to offset K being a non-zero value, on a first clock cycle of a clock signal 215 for loading payload data of data 701, shifter circuit 702 may shift load in an (N−K)*byte length of zero padding, for example effectively (N−K)*8 leading zeroes, and shift load a first K-bytes of a block of multiple byte blocks of payload data from data 701. Thus, for clarity, it should be understood that zero padding "leads" or is "leading" the data for purposes of a CRC calculation therefor. Responsive to payload length L, on each subsequent clock cycle of clock signal 215 N-bytes may be loaded for each block of a remainder of blocks 620 until a last N-bytes, namely an [(M−1)*N+K+1]th byte to [M*N+K] bytes, is shift loaded.

A CRC(S,D) circuit 424 of feed forward circuit 725 may be configured to receive left-aligned payload data 707 to a data input port thereof to determine an interim CRC value at operation 606. A first interim CRC value may be determined for loaded payload with zero padding; however, as leading zero padding has no effect on such CRC determination, such a first interim CRC value is for just such loaded payload.

A seed port of CRC(S,D) circuit 424 may be configured to receive a fixed number of logic 0s from seed signal 325. CRC(S,D) circuit 424 responsive to S and D inputs thereto may output an interim CRC value 708 on each cycle of a clock signal 215 from a CRC(S, D) output port of such circuit for each N-bytes of a current payload. Such CRC values 708 output on successive clock cycles are for left-aligned data and thus may represent this left alignment.

Interim CRC values 708 are generated in a feed forward circuit 725, namely absent any recursive path or feedback input. Additionally, for a variable byte length K, seed values 709 are generated in feed forward circuit 725, namely absent any recursive path or feedback input. Because such processing is in a feed forward circuit 725, such data may optionally be pipelined to increase throughput for processing multiple packets.

Because a feedback path 411 of a feedback circuit 726 only has to deal with N-bytes aligned data, such as for example 512-bit left-aligned data, feedback circuit 726 circuitry for such feedback path 411 is less complex than a conventional recursive path. This reduction in complexity means that feedback path 411 of feedback circuit 726 has less propagation or path delay than a conventional CRC feedback path. This makes scaling a recursive path of feedback circuit 726, for example for 100 Gbps to 200 Gbps, attainable.

Interim CRC values 708 may each be provided as a data input to a modulo-two circuit, such as an XOR circuit 427 of feedback circuit 726, for a modulo-two combine operation with a seed value at operation 608. Though a single XOR gate is illustratively depicted for purposes of clarity, multiple XOR gates may be used. Another data input to XOR circuit 427 may be a feedback or seed signal or value 713, namely a selected value 713, of feedback path 411 output from multiplexer 206 of feedback circuit 726.

At a select value operation at 612, select signal 216 may be used for selecting between a seed value 709 output from table memory 705 and a feedback value 714, provided as an interim CRC value 708 output from an output port of CRC(S,D) circuit 424C of feedback circuit 726, to output a selected value 713. A seed value 709 output may be selected from table memory 705, or optionally may be determined responsive to a K offset, to obtain a seed at operation 607.

Again, because table memory 705 has constants for seed values, an initial data value 340-1 may be obtained as a seed value 709. This simplifies feedback path 411 further by allowing data input to CRC(S, D) circuit 424C to not have a variable data input value 340-1 that varies with K.

Select signal 216 may select seed value 709 for a first clock cycle of clock signal 215 for a current payload, and thereafter select feedback value 714 for continued processing to obtain a final CRC value for a current payload. Select signal 216 may be generated with control circuitry, not shown for purposes of clarity and not limitation, such as a counter to count clock cycles for each payload processed.

Modulo-two output 716 of XOR circuit 427 may be provided to a data input port of accumulation register 202 of feedback circuit 726 to accumulate interim results at operation 609. Again, even though a single flop is illustratively depicted for purposes of clarity, accumulation register 202 may include multiple flops. Accumulation register 202 at operation 609 may receive an interim result 716, which may at operation 609 be accumulated with a previously received interim result 716 for a currently processed payload, to provide an interim output 209.

Accumulation register 202 may be clocked responsive to clock signal 215. On each clock cycle of clock signal 215, an interim CRC value or interim output 209 may be generated. For at least a 512-bit wide input and at least a 200 MHz clock signal as in the above example, an interim CRC value or output 209 may be generated on each clock cycle. Thus, an interim CRC value or output 209 may be generated in a single clock cycle of clock signal 215.

Output from accumulation register 202 may be successive interim CRC values 209 until an M+2 clock cycle for a currently processed payload, at which point in time output of accumulation register 202 may represent a final interim CRC value 209, which is subject to subsequent inversion and bits swapping to produce a final CRC result, such as CRC result output 213. Using payload length L, a number of clock cycles to produce a final interim CRC value 209 for a current payload may be determined by control logic, such as may be implemented in an IC. Optionally, such an IC may be an FPGA or other SoC.

Successive interim CRC values 209 may be provided to a seed input port of CRC(S, D) circuit 424C to determine a feedback value 714 at operation 610. Such feedback value 714 may be fed back for selection as between a seed value 709 and such feedback value 714 at operation 612.

A data input to a data port of CRC(S, D) circuit 424C may be a fixed number of logic 0s, as previously described, with reference to a registered data value 340-2. Along those lines, data zeroes signal or data zeroes 715 may be provided as a data input to a data port of CRC(S, D) circuit 424C. In another example, because data zeroes or data bit zeroes 715 may be the same as data bit zeroes 325, signals 715 and 325 may be the same signal in such other example.

At inversion operation 611, an interim output 209, which may be after M+2 clock cycles of a clock signal 215, may be inverted by inverter circuitry 214 to provide an inverted output 211. At bit swapping operation 613, inverted output 211, which may be after M+2 clock cycles of a clock signal 215, may have bits swapped by bit swap circuitry 212 to provide a CRC result output 213, namely a final result for a current payload.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
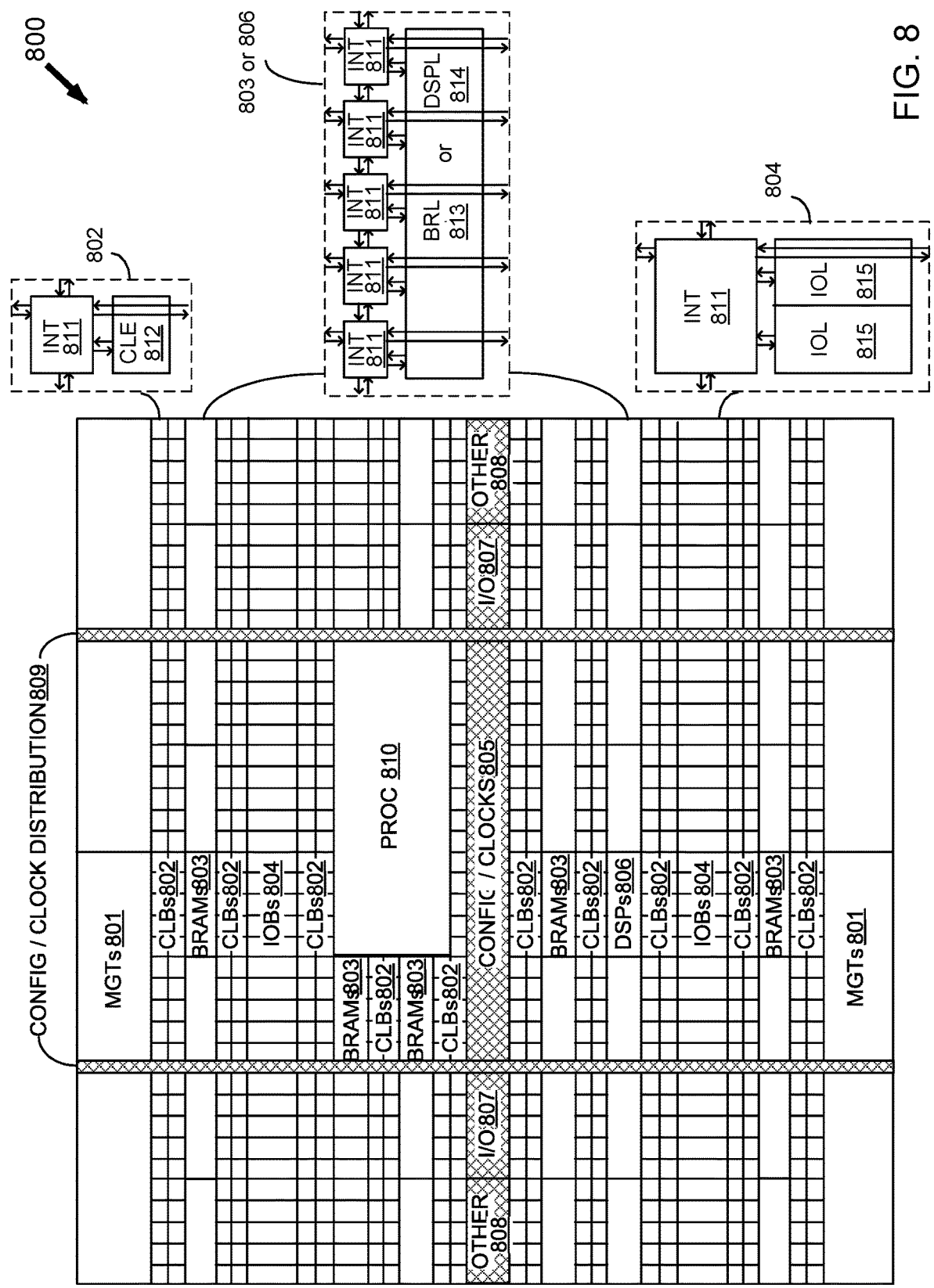
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An IOB 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A cyclic redundancy check ("CRC") engine, comprising:
a feed forward circuit; and
a feedback circuit coupled to the feed forward circuit;
the feed forward circuit comprising:
an offset circuit configured to determine an offset value from header data of an L-byte message, where L=M*N+K such that N is a block size of the CRC engine, M is the number of N-byte blocks in the L-byte message, and K is the offset value that is greater than zero and less than N;
a look-up table circuit configured to select a seed value responsive to the offset value;
a shifter circuit configured to successively load a zero padding and a payload in multiple byte blocks as aligned data with the zero padding leading the payload for a non-zero value of the offset value in a first of the multiple byte blocks having the zero padding and a first portion of the payload; and
a CRC circuit configured to receive data zeroes to a seed port thereof and the aligned data to a data port thereof to provide an interim CRC value.

2. The CRC engine according to claim 1, wherein:
the offset circuit is further configured to further determine a payload length from the header data; and
a byte length of the first portion is the offset value multiplied by a byte.

3. The CRC engine according to claim 1, wherein the look-up table circuit includes table memory configured to store seed values and to input the offset value as a vector input to the look-up table circuit.

4. The CRC engine according to claim 1, wherein the data zeroes are first data zeroes, wherein the CRC circuit is a first CRC circuit, and wherein the feedback circuit comprises:
a modulo-two circuit configured to receive the interim CRC value and a selected one of the seed value or a feedback value to provide a modulo-two output;
an accumulation register configured to receive the modulo-two output to accumulate to provide an interim output; and
a second CRC circuit configured to receive the interim output to a seed port thereof and second data zeroes to a data port thereof to provide the feedback value.

5. The CRC engine according to claim 4, wherein the feedback circuit further comprises a multiplexer configured to select between the feedback value and the seed value for input to the modulo-two circuit.

6. The CRC engine according to claim 5, wherein the accumulation register is configured to receive the modulo-two output to accumulate over a number of clock cycles related to a number of the multiple byte blocks for a payload length of the payload to update the interim output.

7. The CRC engine according to claim 6, wherein the accumulation register is configured to provide the interim output on each of the number of clock cycles for a clock cycle frequency of at least 200 MHz with the multiple byte blocks each being at least 512-bits wide.

8. The CRC engine according to claim 6, wherein the first CRC circuit and the second CRC circuit respectively are a first and a second unfolded linear feedback shift register.

9. The CRC engine according to claim 6, further comprising:
inverter circuitry configured to receive the interim output to provide an inverted output; and
bit swap circuitry configured to receive the inverted output to provide a result output after the number of clock cycles.

10. A receiver, comprising a serial-to-parallel converter having the CRC engine according to claim 4.

11. A method for a cyclic redundancy check ("CRC"), comprising:
obtaining a data container having a payload;
determining an offset value for the payload having L bytes, where L=M*N+K such that N is a block size of the CRC, M is the number of N-byte blocks in the payload, and K is the offset value that is greater than zero and less than N;
determining a zero padding responsive to a non-zero value for the offset value;
obtaining the payload from the data container;
loading the zero padding and a first portion of the payload in an aligned format with the zero padding leading the first portion;

determining an interim CRC value for the first portion and the zero padding;

obtaining a seed value responsive to the offset value;

modulo-two combining a selected value and the interim CRC value to provide an interim result;

accumulating the interim result to provide an interim output;

determining a feedback value responsive to the interim output; and selecting as between the seed value and the feedback value to provide the selected value.

12. The method according to claim 11, wherein the determining of the offset value for the payload comprises determining by an offset circuit the offset value from header data of the data container.

13. The method according to claim 11, wherein the obtaining of the seed value responsive to the offset value comprises looking-up in a look-up table circuit the seed value from seed values stored therein using the offset value as a vector input.

14. The method according to claim 11, wherein:

the loading of the zero padding and the first portion of the payload is followed by successively loading by a shifter circuit in multiple byte blocks a remainder of the payload in the aligned format for a length of the payload; and the loading of the zero padding and the first portion of the payload in the aligned format is for a first of the multiple byte blocks.

15. The method according to claim 14, wherein the determining of the interim CRC value comprises receiving data zeroes to a seed port of a CRC circuit and receiving the zero padding and the first portion of the payload in the aligned format to a data port of the CRC circuit to cause the CRC circuit to provide the interim CRC value.

16. The method according to claim 15, wherein the modulo-two combining of the selected value and the interim CRC value to provide the interim result comprises receiving by a modulo-two circuit the interim CRC value and the selected value to provide a modulo-two output as the interim result.

17. The method according to claim 16, wherein the accumulating of the interim result to provide the interim output comprises:

receiving and accumulating by an accumulation register the modulo-two output over a number of clock cycles related to a number of the multiple byte blocks spanning a payload length of the payload to update the interim output.

18. The method according to claim 17, wherein the data zeroes are first data zeroes, wherein the CRC circuit is a first CRC circuit, and wherein the determining of the feedback value responsive to the interim output is by a second CRC circuit configured to receive the interim output to a seed port thereof and second data zeroes to a data port thereof to provide the feedback value.

19. The method according to claim 18, wherein the selecting as between the seed value and the feedback value to provide the selected value is by a multiplexer.

20. The method according to claim 19, further comprising:

inverting by inverter circuitry the interim output to provide an inverted output; and bit swapping by bit swap circuitry the inverted output to provide a result output after the number of clock cycles.

* * * * *